Patented June 21, 1927.

1,633,262

UNITED STATES PATENT OFFICE.

GEORGE F. MEEHAN, OF FAR ROCKAWAY, AND ARTHUR L. KENNEDY, OF NEW YORK, N. Y., ASSIGNORS, BY MESNE ASSIGNMENTS, TO KEL-PLASTIC CORPORATION, OF NEW YORK, N. Y., A CORPORATION OF DELAWARE.

VEGETABLE SEA-GROWTH DERIVATIVE AND A METHOD FOR THE PREPARATION THEREOF.

No Drawing.    Application filed February 18, 1924.    Serial No. 693,518.

This invention relates to an extractive product obtained from vegetable sea growth and to a process in accordance with which such product may be obtained, and includes correlated improvements and discoveries whereby and wherewith the useful properties of constituents of sea growth are enhanced.

An object of the invention is to provide a process for effectuating the conversion and extraction of constituents of vegetable sea growth in a manner which is of easy accomplishment and results in a relatively large percentage yield of extractive.

A further object of the invention is to provide an extractive which possesses marked adherent properties.

Other objects of the invention are to provide an extractive which is stable, does not crumble when dried, is capable of extensive filamentation is insoluble in the usual inorganic and organic solvents but may be plasticized.

An additional object of the invention is to provide an extractive which is suitable for utilization as a binder or adherent in the manufacture of many types and kinds of articles prepared from plastic masses.

Other objects of the invention will be in part obvious and will in part appear hereinafter.

The invention accordingly comprises the several steps and the relation and order of one or more of such steps with respect to each of the others and the product possessing the features, and properties, which are exemplified in the following detailed disclosure and the scope of the application of which will be indicated in the claims.

In the practice of this invention, in contradistinction to the methods heretofore used for extracting constituents from vegetable sea growth, which methods employed alkaline solutions as the extracting agent and were directed chiefly to the obtainment of alginic acid, or otherwise termed "tang acid", vegetable sea growth belonging to any species or variety, after, preferably, being dried and crushed, is treated with an agent capable of converting the natural complex carbohydrates into less complex carbohydrates for example with an acid solution, which acid solution may be prepared from acid salts, such as sodium bisulphate, sodium bisulphite, potassium bisulphate, potassium bisulphite, sodium dihydrogen phosphate, potassium dihydrogen phosphate, etc., or from mineral acids for example, sulphuric acid, phosphoric acid, and hydrochloric acid.

The subjection of the vegetable sea growth to the treatment with an acid solution may be for a period of from one to two hours, such period, depending upon the concentration of the extracting agent. The concentrations of the acid solution which have been found to give satisfactory results are from 1% to 4%. The temperature range is from ordinary room temperature, say 18° C. to 60° C. The utilization of a higher temperature than room temperature, however, appears to be without any accelerating effect upon the velocity of the reaction. In the reaction mixture the liquid constituents may be separated from the solid constituents by a squeezing action carried out in any desired manner, as for instance by a press or between squeeze rolls, subsequent to which the liquid is filtered. To the filtrate is then added a precipitant with resultant precipitation of substances in solution. This precipitation may be effected by the addition of a liquid in which the substances are insoluble, such as for example, methyl and ethyl alcohols separately or in admixture, or by reaction giving rise to the formation of insoluble compounds. This reaction may be accomplished through the addition of metallic salts. As instances of such salts the following are given, namely: ferric chloride, copper sulphate, zinc chloride, aluminum sulphate, calcium chloride, and salts of other metals such as lead, cobalt, nickel, manganese, barium, etc. The precipitate and mother liquor may be separated as by decanting or filtering, the residue well washed with alcohol in the case of alcohol precipitation, or simply with water in the case of metallic salt precipitation, and dried at a temperature which preferably should not exceed 70° C.

The sea growth utilized is changed in color by this treatment from the usual sepia brown to a dark brilliant green, and the amount of the extractive obtained, while depending upon the variety or species of sea growth, is from 15% to 25% of the dry weight.

The extractive product so obtained in the dry state is of a yellowish brown color. It is insoluble or difficultly soluble in water, and in the usual organic solvents, such as methyl alcohol, ethyl alcohol, ether, chloroform, carbon tetrachloride, petroleum ether and benzene, is partly soluble in toluene, is insoluble after drying, in dilute, that is about 10% alkalis and mineral acids, does not have a well defined melting point but decomposes at temperatures ranging from 500° to 600° C., and is partly soluble and readily plasticized by amino derivatives of members of the pyridine group. It reduces Fehling's solution and with phenyl hydrazine hydrochloride forms an osazone. It possesses marked adherent properties and is well adapted for the manufacture of articles prepared through the intermediate formation of a plastic mass. In the manufacture of these articles the extractive product may serve as a binding and as an impregnating agent.

As illustrative embodiments of a manner of practising the invention the following examples are given:

Example I.

Vegetable sea growth, which has been wholly or partly dried and crushed, is treated with a 1% solution of sulphuric acid in the proportions of one part sea growth to two parts dilute sulphuric acid at a temperature of from 18° to 20° C., and the mixture allowed to stand for from one to two hours. The liquid and solid are separated by squeezing in a press or passage through squeeze rolls, and the liquid filtered in order to remove fully all solid materials. The volume of the filtrate under the usual working conditions is about .9 of that volume which was first taken. To the filtrate there may be added a metallic salt which preferably is added as a solution containing about 10% of the salt. The amount of solution to be added is such as will occasion complete precipitation of the extrative, and for this purpose there may be required for each part of the filtrate about .05 parts of the metallic salt solution. After addition of the metallic salt the admixture is allowed to stand until precipitation no longer takes place. The precipitate may then be separated from the mother liquor and, after thorough washing, dried at a moderate temperature. The drying may be accomplished by placing the precipitate in a stream of air heated to a temperature of not more than 70° C.

The precipitate is flocculent in nature. Its color will vary and is dependent upon the character of the metallic salt used, for example, ferric chloride as the precipitant will produce a brown precipitate whereas with copper sulphate a blue precipitate ensues. The masses so obtained are insoluble in water, in dilute acids, and the usual organic solvents, but are slightly soluble and easily plasticized by amino derivatives of members of the pyridine group.

Example II.

Dry or partly dry and crushed vegetable sea growth may be treated with an acid solution, and the liquid and solid separated as in Example I. From the liquid so obtained the extractive substances may be precipitated by the addition thereto of 90% ethyl alcohol, the proportion of alcohol added with reference to the liquid being as .1 is to 1. A white flocculent mass forms, which may be separated from the mother liquor by decantation or filtration, thoroughly washed with 90% alcohol and dried in a stream of air at a temperature of not over 70° C.

If it is so desired, the steps of drying and crushing may be omitted, but attendant thereto will be a decreased yield of extractive, inasmuch as by means of the drying and crushing the extracting agent is brought into more intimate contact with the sea growth which occasions greater reactivity and extraction.

While the mechanism of the action between the sea growth and the acid extracting agent is not definitely known, it is believed that the process is not merely an extraction operation, but that the constituents are affected chemically probably by hydrolysis. The structures of the substances which are subject to the action of the acid are not known, nor are the compounds which are formed, but the reactions with Fehling's solution and with phenyl hydrazine hydrochloride indicate the presence in the extract of carbohydrates having an aldose structure. The natural complex carbohydrates being without reaction with Fehling's solution and phenyl hydrazine hydrochloride leads to the conclusion that the effect of the action of the acid extracting agent is to convert these natural complex carbohydrates through hydrolysis into carbohydrates of simpler structure. That a mixture of carbohydrates in a large measure is formed is considered to be indicated in that the osazones produced do not have sharp melting points, but gradually recede from the side of the melting point tube beginning at a temperature of about 155° C. and being completed at a temperature of about 175° C.

Since certain changes may be made in carrying out the above process and in the product without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. A process for the preparation of a derivative from vegetable sea growth, which comprises treating vegetable sea growth with a solution containing a mineral acidic agent capable of converting the natural complex carbohydrates into less complex carbohydrates, and then adding a precipitant to the solution thus obtained.

2. A process for the preperation of a derivative from vegetable sea growth, which comprises treating vegetable sea growth with a solution containing from about 1% to 4% of hydrogen sulphate in the proportions of one part of vegetable sea growth to two parts of dilute hydrogen sulphate, allowing the mixture to stand for from about one to about two hours, separating the liquid and solid ingredients, adding to the solution separated about .05 parts of a solution containing 10% of a metallic salt adapted to cause precipitation of the derivative, and separating the resultant precipitate from the mother liquor.

3. A derivative from vegetable sea growth which is obtained by treating vegetable sea growth with an acidic solution and precipitating with a metallic salt; is in the dry state, insoluble in water, dilute acids and alkalis, and the usual organic solvents; reduces Fehling's solution; forms an osazone with phenyl hydrazine hydrochloride; is plasticized by amino derivatives of members of the pyridine group, and is an adherent.

In testimony whereof we affix our signatures.

GEORGE F. MEEHAN.
ARTHUR L. KENNEDY.